(12) United States Patent
Hsiao et al.

(10) Patent No.: US 12,254,690 B2
(45) Date of Patent: Mar. 18, 2025

(54) METHOD FOR VIDEO RECOGNITION AND RELATED PRODUCTS

(71) Applicant: GUANGDONG OPPO MOBILE TELECOMMUNICATIONS CORP., LTD., Guangdong (CN)

(72) Inventors: Jenhao Hsiao, Palo Alto, CA (US); Jiawei Chen, Palo Alto, CA (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 429 days.

(21) Appl. No.: 17/932,360

(22) Filed: Sep. 15, 2022

(65) Prior Publication Data

US 2023/0005264 A1     Jan. 5, 2023

Related U.S. Application Data

(63) Continuation of application No. PCT/CN2021/083326, filed on Mar. 26, 2021.

(60) Provisional application No. 63/000,011, filed on Mar. 26, 2020.

(51) Int. Cl.
G06V 20/40      (2022.01)
G06V 10/774     (2022.01)
G06V 10/82      (2022.01)

(52) U.S. Cl.
CPC ............ *G06V 20/40* (2022.01); *G06V 10/774* (2022.01); *G06V 10/82* (2022.01); *G06V 20/41* (2022.01); *G06V 20/44* (2022.01)

(58) Field of Classification Search
None
See application file for complete search history.

(56) References Cited

U.S. PATENT DOCUMENTS

2022/0141503 A1*  5/2022  Cui ..................... G06V 10/761
                                                725/19
2022/0327840 A1* 10/2022  Ambeck-Madsen .. G06V 10/62

FOREIGN PATENT DOCUMENTS

| CN | 106096568 | 11/2016 |
| CN | 108701236 | 10/2018 |
| CN | 109558791 | 4/2019 |
| CN | 109711552 | 5/2019 |
| WO | 2019136066 | 7/2019 |

OTHER PUBLICATIONS

WIPO, International Search Report and Written Opinion for International Application No. PCT/CN2021/083326, Jun. 29, 2021.

\* cited by examiner

*Primary Examiner* — Casey L Kretzer
(74) *Attorney, Agent, or Firm* — Hodgson Russ LLP

(57) ABSTRACT

A method for video recognition and related products are provided. The method includes the following. An original set of clip descriptors is obtained by providing multiple clips of a video as an input of a 3D CNN of a neural network, where the neural network includes the 3D CNN and at least one first fully connected layer, and each of the multiple clips includes at least one frame. An attention vector corresponding to the original set of clip descriptors is determined. An enhanced set of clip descriptors is obtained based on the original set of clip descriptors and the attention vector. The enhanced set of clip descriptors is input into the at least one first fully connected layer and video recognition is performed based on an output of the at least one first fully connected layer.

20 Claims, 6 Drawing Sheets

METHOD FOR VIDEO RECOGNITION AND RELATED PRODUCTS

CROSS-REFERENCE TO RELATED APPLICATION(S)

This application is a continuation of International Application No. PCT/CN2021/083326, filed Mar. 26, 2021, which claims priority to U.S. Provisional Application No. 63/000,011, filed Mar. 26, 2020, the entire disclosures of which are incorporated herein by reference.

TECHNICAL FIELD

This disclosure relates to the field of video recognition technology, and more particularly to a method for video recognition and related products.

BACKGROUND

Most existing video recognition techniques rely on trimmed videos as their inputs. However, most videos, even for short videos, in the real world are untrimmed and contain large numbers of irrelevant frames. One of popular methods is to directly use a central clip in a video as the input for video recognition, which assume that the central clip is the most related event and can be served as a cleanly-trimmed video. While the other method uniformly segments a video and take average of all output for video class prediction, which is usually complex and needs to process all video segments in the video.

How to extracting salient information in the video accurately and quickly has been a problem to be solved.

SUMMARY

In a first aspect, a method for video recognition is provided. The method for video recognition includes the following. An original set of clip descriptors is obtained by providing multiple clips of a video as an input of a three-dimensional (3D) convolutional neural network (CNN) of a neural network, where the neural network includes the 3D CNN and at least one first fully connected layer, and each of the multiple clips includes at least one frame. An attention vector corresponding to the original set of clip descriptors is determined. An enhanced set of clip descriptors is obtained based on the original set of clip descriptors and the attention vector. The enhanced set of clip descriptors is input into the at least one first fully connected layer and video recognition is performed based on an output of the at least one first fully connected layer.

In a second aspect, a method for training a neural network is provided. The method for training a neural network includes the following. An original set of clip descriptors is obtained by providing multiple clips of a video as an input of a 3D CNN of a neural network, where the neural network includes the 3D CNN and at least one first fully connected layer, the 3D CNN includes at least one convolutional layer and at least one second fully connected layer, and each of the multiple clips includes at least one frame. An attention vector corresponding to the original set of clip descriptors is determined. An enhanced set of clip descriptors is obtained based on the original set of clip descriptors and the attention vector. The enhanced set of clip descriptors is input into the at least one first fully connected layer and an output of the neural network is obtained. The neural network is trained by updating parameters of the neural network based on a loss of the neural network, where the parameters of the network include a weight of the at least one first fully connected layer and a weight of the at least one second fully connected layer.

In a third aspect, an apparatus for video recognition is provided. The apparatus is based on a neural network. The apparatus includes at least one processor and a memory coupled with the at least one processor. The memory is configured to store instructions which, when executed by the at least one processor, are operable with the processor to implement the neural network to: obtain an original set of clip descriptors by providing multiple clips of a video as an input of a 3D CNN of a neural network, where the neural network includes the 3D CNN and at least one first fully connected layer, and each of the multiple clips includes at least one frame; determine an attention vector corresponding to the original set of clip descriptors; obtain an enhanced set of clip descriptors based on the original set of clip descriptors and the attention vector; input the enhanced set of clip descriptors into the at least one first fully connected layer and perform video recognition based on an output of the at least one first fully connected layer.

BRIEF DESCRIPTION OF THE DRAWINGS

In order to describe technical solutions of implementations more clearly, the following will give a brief description of accompanying drawings used for describing the implementations. Apparently, accompanying drawings described below are merely some implementations. Those of ordinary skill in the art can also obtain other accompanying drawings based on the accompanying drawings described below without creative efforts.

DETAILED DESCRIPTION

In order for those skilled in the art to better understand technical solutions of implementations, technical solutions of implementations will be described clearly and completely with reference to accompanying drawings in the implementations. Apparently, implementations hereinafter described are merely some implementations, rather than all implementations, of the disclosure. All other implementations obtained by those of ordinary skill in the art based on the implementations herein without creative efforts shall fall within the protection scope of the disclosure.

The terms "first", "second", "third", and the like used in the specification, the claims, and the accompany drawings of the disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

A mobile terminal referred to herein may include various handheld devices, in-vehicle devices, wearable devices, computing devices that have wireless communication functions or other processing devices connected to a wireless modem, as well as various forms of user equipment (UE), mobile stations (MS), terminal devices, and the like. For ease of description, the above-mentioned devices are collectively referred to as a mobile terminal.

Hereinafter, detailed description of implementations of the present disclosure will be given below.

The neural network in the present disclosure includes a three-dimensional (3D) convolutional neural network (CNN) and at least one first fully connected layer, where the 3D CNN includes at least one convolutional layer and at least one second fully connected layer. In other words, the neural network includes one or more convolutional layers and one or more fully connected layers, the one or more convolutional layers and part of the one or more fully connected layers form the 3D CNN, and the 3D CNN and the other part of the one or more fully connected layers form the entire neural network.

Figure 1:
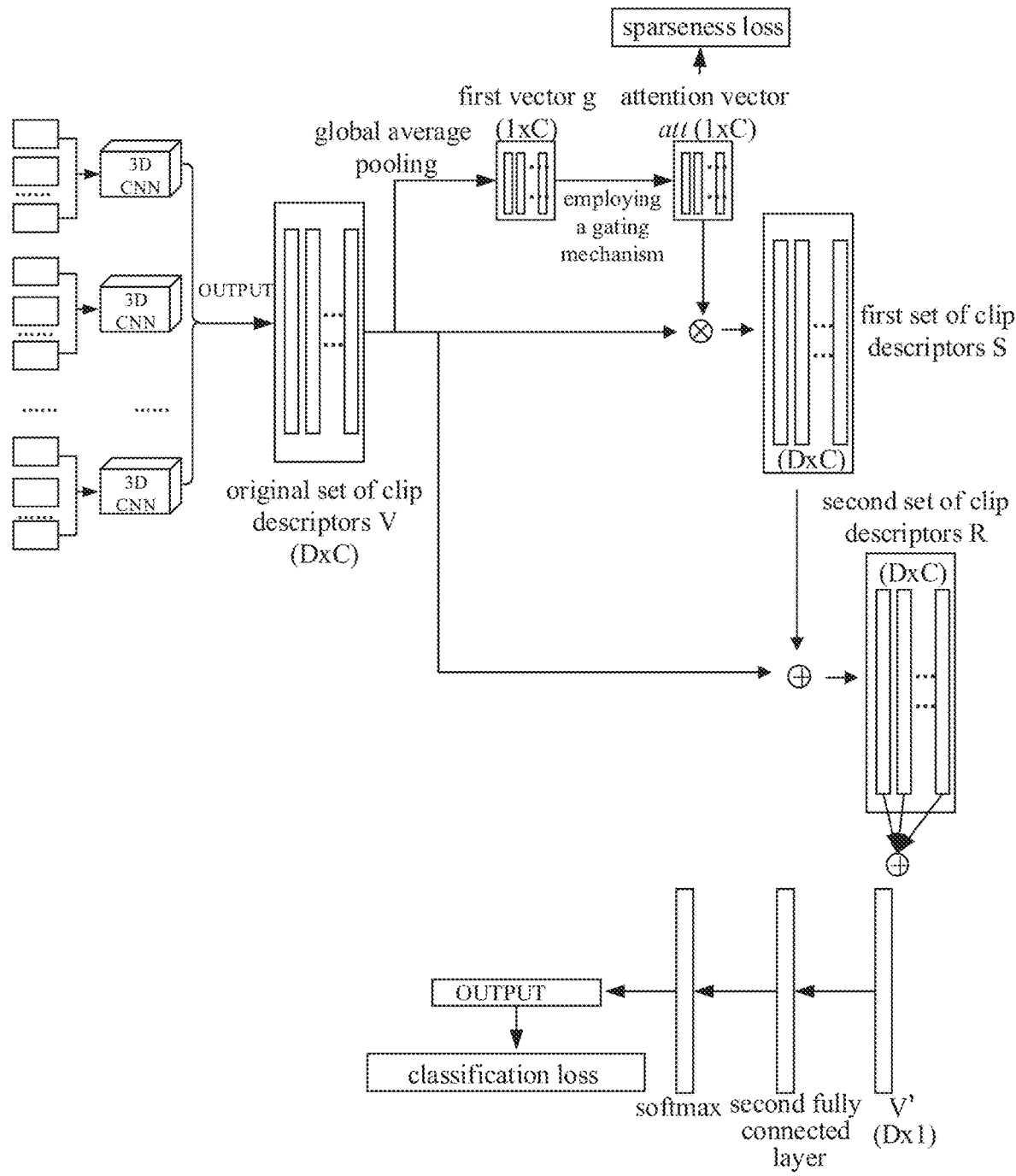
FIG. 1 is a diagram of a framework of a neural network according to implementations.

FIG. 1 is a diagram of a framework of a neural network according to implementations. As illustrated in FIG. 1, an original set of clip descriptors is obtained by providing multiple clips of a video as an input of a 3D CNN of a neural network. An attention vector corresponding to the original set of clip descriptors is determined. An enhanced set of clip descriptors is obtained based on the original set of clip descriptors and the attention vector. The enhanced set of clip descriptors is input into the at least one first fully connected layer and video recognition is performed based on an output of the at least one first fully connected layer. Detailed description of the framework of the neural network will be described in detail with reference of following method implementations.

Figure 2:
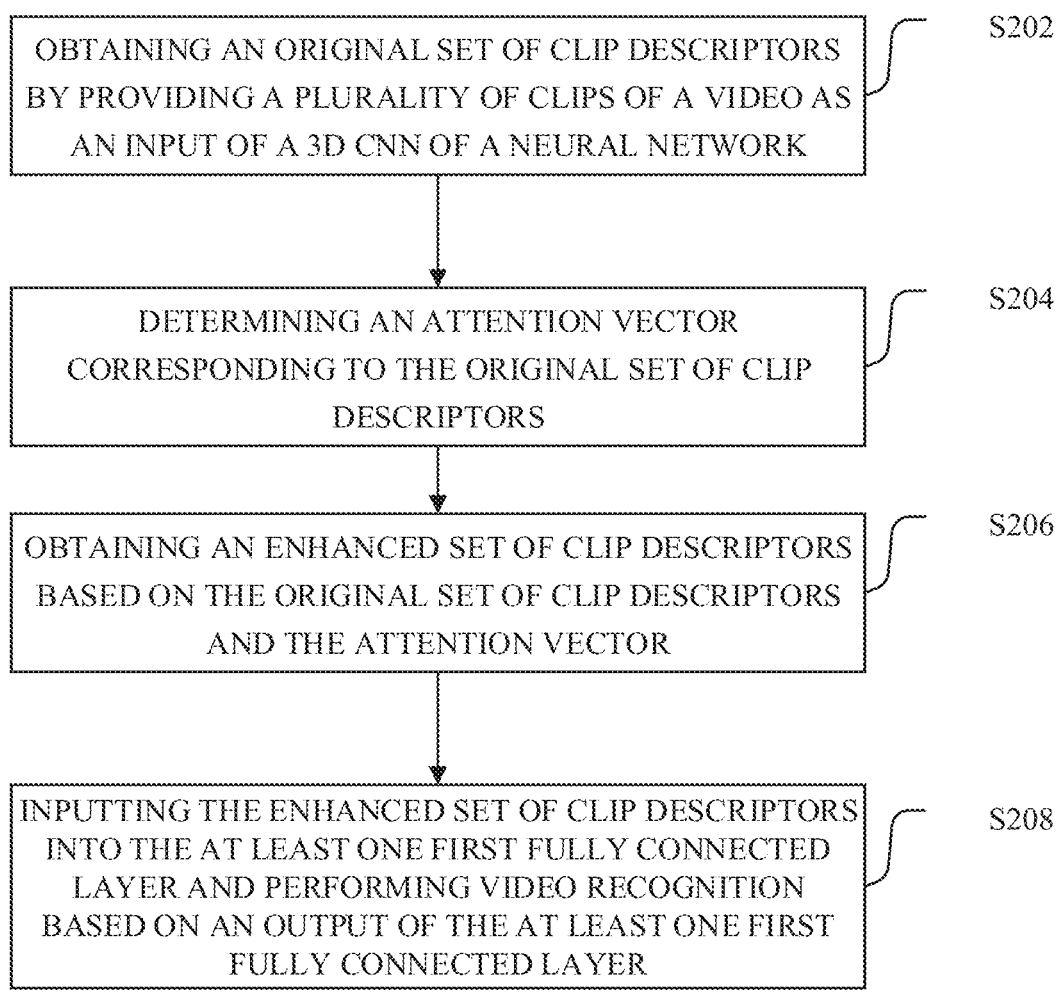
FIG. 2 is a schematic flowchart of a method for video recognition according to implementations.
Figure 3:
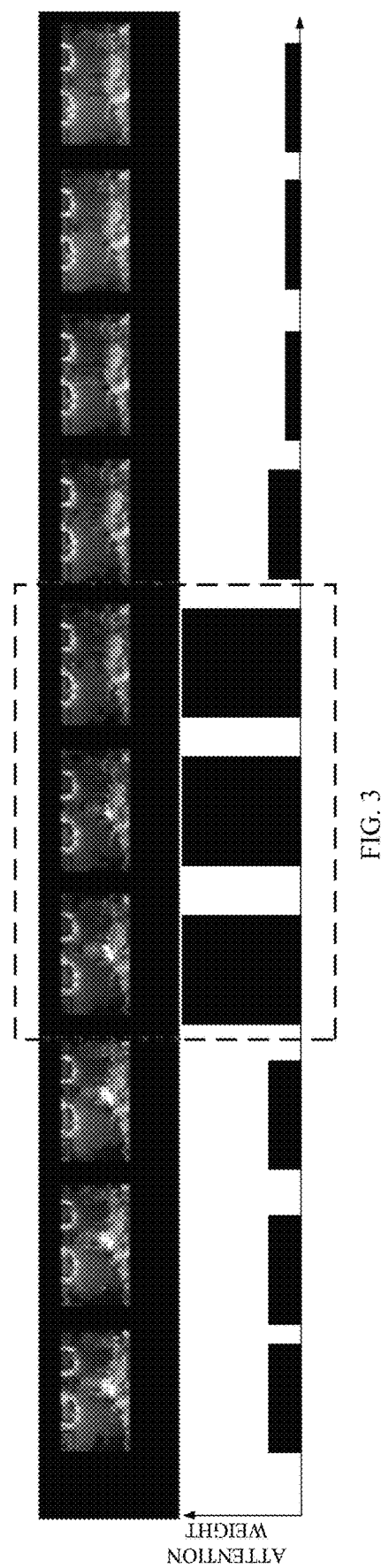
FIG. 3 illustrates an example recognition result according to implementations.

FIG. 2 is a schematic flowchart of a method for video recognition according to implementations. As illustrated in FIG. 2, an original set of clip descriptors is obtained by providing multiple clips of a video as an input of a 3D CNN of a neural network, an attention vector corresponding to the original set of clip descriptors is determined, an enhanced set of clip descriptors is obtained based on the original set of clip descriptors and the attention vector and input into the at least one first fully connected layer, and video recognition is performed based on an output of the at least one first fully connected layer. The following are described in detail.

S202, an original set of clip descriptors is obtained by providing multiple clips of a video as an input of a 3D CNN of a neural network.

The neural network includes the 3D CNN and at least one fully connected layer, and each of the multiple clips includes at least one frame. The at least one fully connected layer includes at least one first fully connected layer and at least one second fully connected layer. The at least one convolutional layer and the at least one second fully connected layer form the 3D CNN. The 3D CNN and the at least one first fully connected layer form entire the neural network in the present disclosure. For example, multiple clips $X=\{x_1, x_2, \ldots, x_c\}$ can be set as an input of the neural network and each clip x may contain at least one frame, such as 16 stacked frames. When the multiple clips are input into the neural network, each clip will be firstly processed by the 3D CNN of the neural network. The 3D CNN may contain a set of 3D convolutional layers, which are used to extract clip features corresponding to the multiple clips, and a set of first fully connected layers. The input shape for one batch data (i.e., the shape for the input of the 3D CNN of the neural network) can be represented as C×T×H×W×ch, where C denotes the number of clips, T frames are stacked together to form a clip, each of the T frames has a height H and a width W. ch denotes the channel number, and in the present disclosure, ch is 3 for RGB images. A convolutional kernel for each 3D convolutional layer in the 3D CNN is in three dimensions, being k×k×k. Then for each 3D convolutional layer, data will be computed among three dimensions simultaneously. The output of 3D CNN is the original set of clip descriptors $V=\{v_1, v_2, \ldots, v_c\}$, where $v \in R^D$ and v is the output of last second fully connected layer of 3D CNN. D denotes the number of convolution kernels, for example, D=2048.

S204, an attention vector corresponding to the original set of clip descriptors is determined.

Since each clip descriptor are produced by the 3D CNN (i.e., a 3D CNN module) separately, inter-clip relationships modelled by convolution are inherently implicit and local. That is, each clip descriptor can only observe an extremely limited local event and there are no inter-clip relationships. However, duration of different actions in the video are variant and complex actions could across multiple video segments (i.e., multiple clips can be involved), no inter-clip relationships among clip descriptors produced by 3D CNN becomes a performance bottleneck for video recognition. To mitigate this problem that each clip descriptor is unable to exploit contextual information outside of its scope, an attention mechanism is used to alleviate this limitation. By means of the attention vector in the present disclosure, clip inter-dependencies can be explicitly modelled, the learning of convolutional features can be enhanced, so that the neural network is able to increase its sensitivity to informative features across segments and can deliver a better decision of video recognition based on a global view. The attention vector includes multiple attention weights. Each of the multiple clips correspond to each clip descriptor in the original set of clip descriptors in one-to-one correspondence, and each of the attention weights correspond to each clip descriptor in the original set of clip descriptors in one-to-one correspondence. For example, the input is N clips of a video, then the original set of clip descriptors has N clip descriptors, and the attention vector includes N elements (i.e., N attention weights). There is a one-to-one-to-one mapping relationship among N clips, N clip descriptors, and N attention weights.

S205, an enhanced set of clip descriptors is obtained based on the original set of clip descriptors and the attention vector.

The enhanced set of clip descriptors is obtained by rescaling the original set of clip descriptors with the attention vector (i.e., activations). The attention vector intrinsically introduces dynamics conditioned on the original set of clip descriptors. The attention vector can be regarded as a self-attention function on clips whose relationships are not confined to the local receptive field 3D convolutional filters are responsive to. By means of the attention vector, each clip descriptor in the original set of clip descriptors corresponds to an attention weight, therefore by processing each clip descriptor in the original set of clip descriptors with a corresponding attention weight, uniformly averaging all clips can be avoided and video accuracy can be improved.

S208, the enhanced set of clip descriptors is inputting into the at least one first fully connected layer and video recognition is performed based on an output of the at least one first fully connected layer.

By means of the implementation of the present disclosure, multiple clips of a video are obtained as an input, original set of clip descriptors is obtained by inputting the multiple clips into a 3D CNN of a neural network, an attention vector corresponding to the original set of clip descriptors is determined, an enhanced set of clip descriptors is obtained based on the original set of clip descriptors and the attention vector and then input into the at least one first fully connected layer, and finally video recognition is performed based on an output of the at least one first fully connected layer. By means of the attention vector, each clip descriptor in the original set of clip descriptors corresponds to an attention weight, therefore by processing each clip descriptor in the original set of clip descriptors with a corresponding attention weight, uniformly averaging all clips can be avoided and video accuracy can be improved.

As an implementation, the attention vector corresponding to the original set of clip descriptors is determined as follows.

A first vector is obtained by performing a global average pooling on the original set of clip descriptors. The attention vector is obtained by employing a gating mechanism on the first vector based on a weight of the at least one second fully connected layer, where the 3D CNN includes at least one convolutional layer and the at least one second fully connected layer.

In order to obtain the attention vector, clip-wise statistics that is the first vector is first generated by global average pooling. The pooled output can be interpreted as a collection of local descriptors (i.e., the original set of clip descriptors) whose statistics are expressive for the whole clip. The first vector can be defined as:

$$g = [g(v_1), g(v_1), \ldots, g(v_c)],$$

$$g(v) = \frac{1}{D}\sum_i v^i$$

where $v^i$ is the i-th element of a clip descriptor. As stated above, D denotes the number of convolution kernels, when D=2048, the first vector can be defined as:

$$g(v) = \frac{1}{2048}\sum_i v^i$$

Then a second operation which aims to fully capture clip-wise dependencies is performed. To fulfil this objective, a function used in the second operation shall meet two criteria: first, it shall be capable of learning a nonlinear interaction between clips; second, it shall learn a non-mutually-exclusive relationship since it needs to be ensured that multiple clips are allowed to be emphasized. To meet these criteria, a gating mechanism with a sigmoid activation is employed.

As an implementation, the attention vector is obtained by employing the gating mechanism on the first vector based on the weight of the at least one second fully connected layer as follows.

The first vector (i.e., g) is multiplied by a first weight (i.e., $w_1$) of the at least one second fully connected layer to obtain a second vector (i.e., $w_1g$). The second vector is processed based on a rectified linear unit (ReLU) function to obtain a third vector (i.e., $\sigma_{ReLU}(w_1g)$). The third vector is multiplied by a second weight of the at least one second fully connected layer (i.e., $w_2$) to obtain a fourth vector (i.e., $w_2\sigma_{ReLU}(w_1g)$). The fourth vector is processed based on an activation function to obtain the attention vector (i.e., $\sigma_{sigmoid}(w_2\sigma_{ReLU}(w_1g))$).

The attention vector can be defined as:

$$att = \sigma_{sigmoid}(w_2\sigma_{ReLU}(w_1g)),$$

where $\sigma_{ReLU}$ refers to a rectified linear unit (ReLU) function, $w_1$ and $w_2$ are weights of second fully connected layer of 3D CNN, and $\sigma_{sigmoid}$ is a sigmoid function. In this way, the attention vector is defined in a clip-agnostic way, which is useful to identify segments relevant to the action of interest and estimate temporal intervals of detected actions.

The enhanced set of clip descriptors can be obtained based on the original set of clip descriptors and the attention vector in many ways.

As an implementation, the enhanced set of clip descriptors is obtained based on the original set of clip descriptors and the attention vector as follows.

The enhanced set of clip descriptors is obtained by multiplying the original set of clip descriptors by the attention vector.

The enhanced set of clip descriptors can be defined as:

$$S = \{s_1, s_2, \ldots, s_c\},$$

$$s_c = att_c \times v_c$$

As an implementation, the enhanced set of clip descriptors can also be obtained based on the original set of clip descriptors and the attention vector as follows.

A first set of clip descriptors is obtained by multiplying the original set of clip descriptors by the attention vector S. The enhanced set of clip descriptors R is obtained by adding the first set of clip descriptors to the original set of clip descriptors (i.e., R=V+S).

To make the learning more robust and effective, the enhanced set of clip descriptors can be defined as:

$$R = V + S,$$

$$S = \{s_1, s_2, \ldots, s_c\},$$

$$s_c = att_c \times v_c,$$

where $R = \{r_1, r_2, \ldots, r_c\}$ can be considered as the enhanced set of clip descriptors in other words, R can be considered as refined clip descriptors. As an implementation, the enhanced set of clip descriptors is input into the at least one first fully connected layer and video recognition is performed based on the output of the at least one first fully connected layer as follows.

A fifth vector denoted by v', is determined based on the enhanced set of clip descriptors. The fifth vector v' can be defined as:

$$v' = \sum r_i/C$$

The output of the at least one first fully connected layer is obtained by multiplying the fifth vector by a weight of the at least one first fully connected layer (i.e., $w_3v'$). An output of the neural network which is used for video recognition is obtained by processing the output of the at least one first fully connected layer based on a SoftMax function. The output of the neural network, based on v', can be defined as:

$$\text{output} = \sigma_{softmax}(w_3v').$$

where $w_3$ is the weight of the at least one first fully connected layer, and $\sigma_{softmax}$ is a SoftMax function.

As an implementation, the method further includes the following.

Parameters of the neural network are obtained based on a loss, where parameters of the neural network include the weight of the at least one first fully connected layer and the weight of the at least one second fully connected layer, the weight of the at least one second fully connected layer includes the first weight of the at least one second fully connected layer and the second weight of the at least one second fully connected layer, the loss includes a classification loss corresponding to an output of the neural network and a sparsity loss corresponding to the attention vector.

As an implementation, the classification loss is based on a standard cross-entropy loss between a ground truth corresponding to the input and the output of the neural network corresponding to the input, and the sparsity loss is obtained by performing L1 norm on the attention vector.

A loss function in the proposed neural network is composed of two terms, the classification loss and the sparsity loss, which is given by:

$$L = L_C + \beta L_S$$

where $L_C$ (i.e., $L_{class}$) denotes the classification loss computed on video-level class labels, $L_s$ (i.e., $L_{sparsity}$) is the sparsity loss on the attention vector, and $\beta$ is a constant to control the trade-off between the two terms. The classification loss is based on the standard cross-entropy loss between ground truth and the output (after passing through the proposed neural network as illustrated in previous section), while the sparsity loss is given by the L1 norm on attention vector att, and the attention vector can be defined as:

$$L_S = \|att\|_1$$

Because of the use of the sigmoid function and the L1 loss, all attention weights in the attention vector tend to have values close to either 0 or 1. In this case, an action can be recognized with a sparse subset of key segments in a video, which will help locating relevant clips for action detection.

In the present disclosure, a novel weakly supervised temporal action recognition and localization algorithm based on an end-to-end deep neural network are proposed. Comparing to other method in the related art, the present disclosure provides the following advantages.

First, recognition accuracy is improved.

Classification is performed by evaluating a video-level representation given by a carefully designed neural network architecture that fully employ inter-clip relationships to better describe an action event with variant length (e.g., across several clips) and thus boost the overall recognition accuracy.

To prove the effectiveness of the present disclosure, Table 1 shows accuracy comparison of different methods in Kinetics-600, which consists 600 action classes and contains around 20 k videos for validation. As can be seen that in traditional method, which assume that the central clip is the most related event and directly use it as the input, can achieve the poorest 58.58% top-1 accuracy. The poor accuracy is mainly due to the lack of fully utilizing the information in the video (e.g., the rest relevant clips). Naïve average of clips is another popular method, but it can only achieve 65.3% top-1 accuracy. Since an action is usually complex and across video segments, uniformly average all clips is obviously not the best strategy and can only achieve limited accuracy. Our method achieves the best 67.46% top-1 accuracy due to the introduction of inter-clip interdependencies, which in turn proves that the inter-clip relationships is a key to model a complex action event in a real-world untrimmed video.

TABLE 1

Accuracy comparison of different methods in Kinetics-600

| Method | Top-1 Accuracy (%) |
| --- | --- |
| 3D ResNet-101 + Central clip | 58.58 |
| 3D ResNet-101 + 10 clips average | 65.30 |
| Our method (back bone: 3D ResNet-101) | 67.46 |

Second, the method for video recognition according to implementations can achieve action detection without the need of clip- or frame-level annotations. As can been seen in FIG. 2, the action (in this case, blowing candles) can be easily located by using the attention vector with a threshold (e.g., >0.7). In other words, a clip of a video corresponds to a clip descriptor, and a clip descriptor corresponds to an attention weight in the attention vector. When the threshold is set to 0.7, one or more attention weights the values of which are greater than 0.7 are determined, thus one or more clips of the video that correspond to the or more attention weights the values of which are greater than 0.7 are determined, and these determined one or more clips of the video can be used for video recognition, such as for action recognition.

Figure 4:
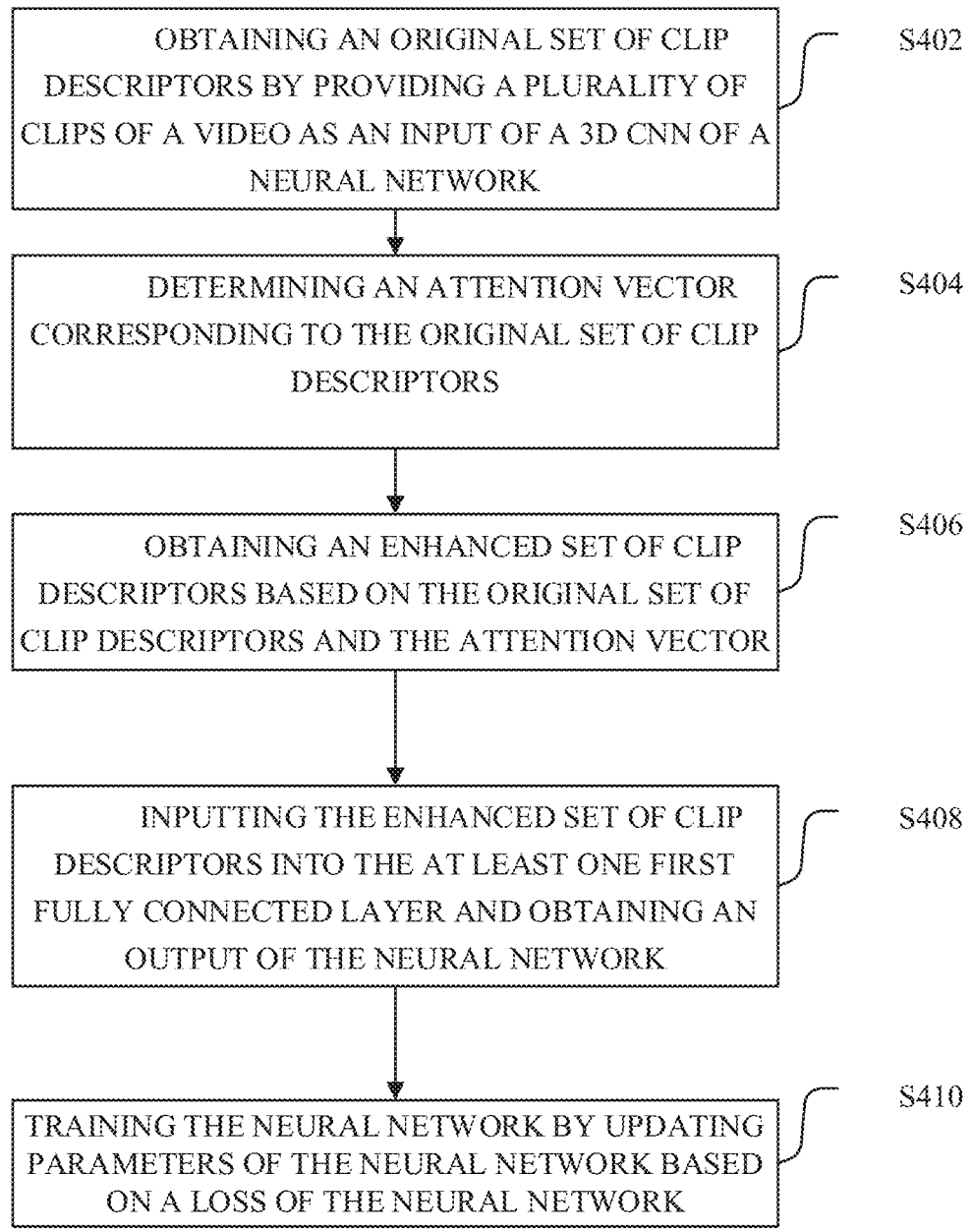
FIG. 4 is a schematic flowchart of a method for training a network according to implementations.

FIG. 4 is a schematic flowchart of a method for training a neural network according to implementations. The neural network can be used for video recognition as described in the implementation as illustrated in FIG. 2. As illustrated in FIG. 4, the method includes the following.

S402, an original set of clip descriptors is obtained by providing multiple clips of a video as an input of a 3D CNN of a neural network.

The neural network includes the 3D CNN and at least one first fully connected layer, the 3D CNN includes at least one convolutional layer and at least one second fully connected layer, and each of the multiple clips includes at least one frame.

S404, an attention vector corresponding to the original set of clip descriptors is determined.

S406, an enhanced set of clip descriptors is obtained based on the original set of clip descriptors and the attention vector.

S408, the enhanced set of clip descriptors is input into the at least one first fully connected layer and an output of the neural network is obtained.

S410, the neural network is trained by updating parameters of the neural network based on a loss of the neural network.

The parameters of the network include a weight of the at least one first fully connected layer and a weight of the at least one second fully connected layer.

As an implementation, the attention vector corresponding to the original set of clip descriptors is determined as follows.

A first vector is obtained by performing a global average pooling on the original set of clip descriptors. The attention vector is obtained by employing a gating mechanism on the first vector based on a weight of the at least one second fully connected layer, where the 3D CNN includes at least one convolutional layer and the at least one second fully connected layer.

As an implementation, the attention vector is obtained by employing the gating mechanism on the first vector based on the weight of the at least one second fully connected layer as follows.

The first vector is multiplied by a first weight of the at least one second fully connected layer to obtain a second vector. The second vector is processed based on a rectified linear unit (ReLU) function to obtain a third vector. The third vector is multiplied by a second weight of the at least one second fully connected layer to obtain a fourth vector. The fourth vector is processed based on an activation function to obtain the attention vector.

As an implementation, the enhanced set of clip descriptors is obtained based on the original set of clip descriptors and the attention vector as follows.

The enhanced set of clip descriptors is obtained by multiplying the original set of clip descriptors by the attention vector.

As an implementation, the enhanced set of clip descriptors is obtained based on the original set of clip descriptors and the attention vector as follows.

A first set of clip descriptors is obtained by multiplying the original set of clip descriptors by the attention vector. The enhanced set of clip descriptors is obtained by adding the first set of clip descriptors to the original set of clip descriptors.

As an implementation, the enhanced set of clip descriptors is input into the at least one first fully connected layer and an output of the neural network is obtained as follows.

A fifth vector is determined based on the enhanced set of clip descriptors. The output of the at least one first fully connected layer is obtained by multiplying the fifth vector by a weight of the at least one first fully connected layer. The output of the neural network which is used for video recognition is obtained by processing the output of the at least one first fully connected layer based on a SoftMax function.

As an implementation, the loss includes a classification loss corresponding to the output of the neural network and a sparsity loss corresponding to the attention vector.

As an implementation, the classification loss is based on a standard cross-entropy loss between a ground truth corresponding to the input and the output of the neural network corresponding to the input, and the sparsity loss is obtained by performing L1 norm on the attention vector.

For detailed descriptions of operations of the method for training a neural network, reference can be made to the related operations of the method for video recognition, which will not be described in detail.

Figure 5:
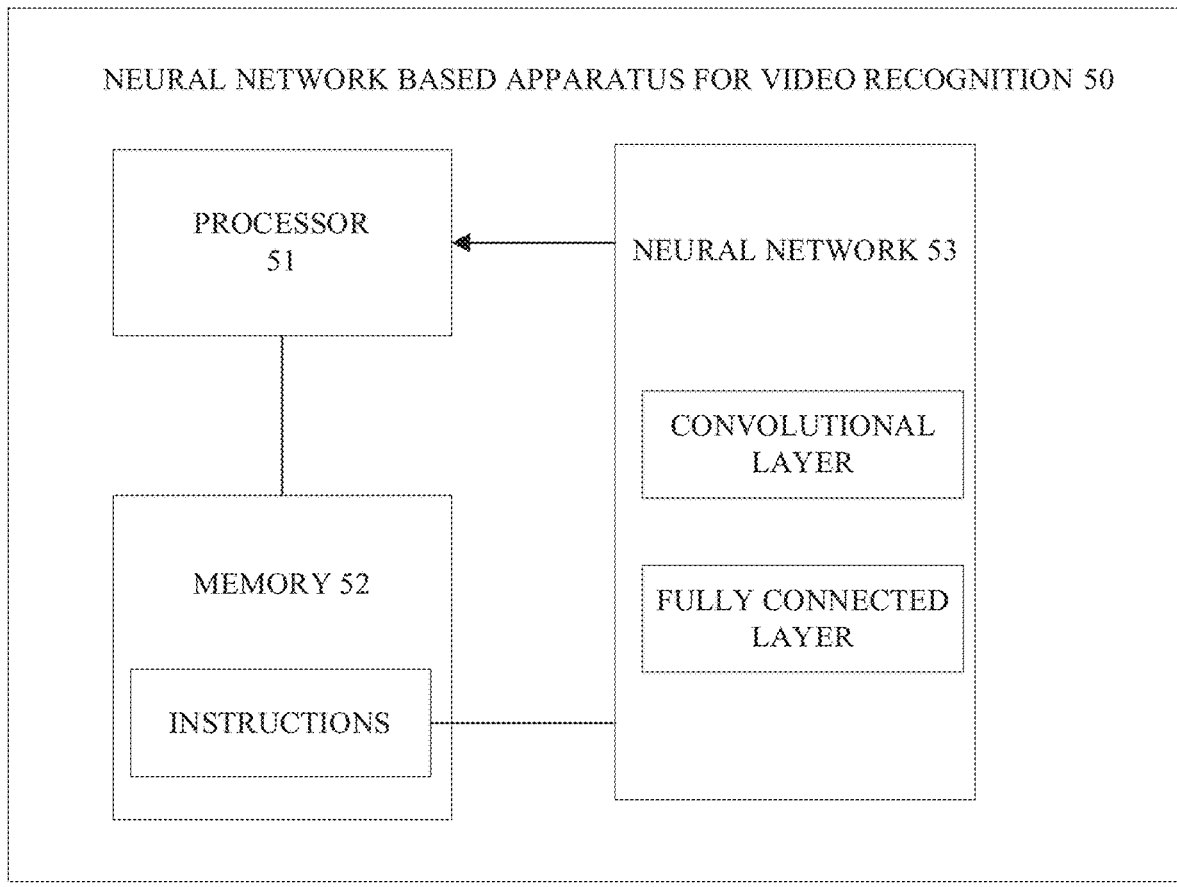
FIG. 5 is schematic structural diagram of an apparatus for video recognition according to implementations.

FIG. 5 is a schematic structural diagram of a neural network based apparatus 50 for video recognition. As illustrated in FIG. 5, the apparatus includes at least one processor 501, a memory 502, and a neural network 503. The neural network 503 includes at least one convolutional layer and at least one fully connected layer. The at least one fully connected layer may further include at least one first fully connected layer and at least one second fully connected layer. The memory 502 is coupled with the at least one processor and configured to store instructions which, when executed by the at least one processor, are operable with the processor to implement a neural network 503 to perform the following.

An original set of clip descriptors is obtained by providing multiple clips of a video as an input of a 3D CNN of a neural network, where the neural network includes the 3D CNN and at least one first fully connected layer, and each of the multiple clips includes at least one frame. An attention vector corresponding to the original set of clip descriptors is determined. An enhanced set of clip descriptors is obtained based on the original set of clip descriptors and the attention vector. The enhanced set of clip descriptors is input into the at least one first fully connected layer and video recognition is performed based on an output of the at least one first fully connected layer.

As an implementation, the instructions being operable with the at least one processor 501 to implement the neural network 503 to determine the attention vector corresponding to the original set of clip descriptors are operable with the at least one processor to implement the neural network to: obtain a first vector by performing a global average pooling on the original set of clip descriptors; obtain the attention vector by employing a gating mechanism on the first vector based on a weight of the at least one second fully connected layer, where the 3D CNN includes at least one convolutional layer and the at least one second fully connected layer.

As an implementation, the instructions being operable with the at least one processor 501 to implement the neural network 503 to obtain the attention vector by employing the gating mechanism on the first vector based on the weight of the at least one second fully connected layer are operable with the at least one processor to implement the neural network to: multiply the first vector by a first weight of the at least one second fully connected layer to obtain a second vector; process the second vector based on a rectified linear unit (ReLU) function to obtain a third vector; multiply the third vector by a second weight of the at least one second fully connected layer to obtain a fourth vector; process the fourth vector based on an activation function to obtain the attention vector.

As an implementation, the instructions being operable with the at least one processor 501 to implement the neural network 503 to obtain the enhanced set of clip descriptors based on the original set of clip descriptors and the attention vector are operable with the at least one processor to implement the neural network to: obtain the enhanced set of clip descriptors by multiplying the original set of clip descriptors by the attention vector.

As an implementation, the instructions being operable with the at least one processor 501 to implement the neural network 503 to obtain the enhanced set of clip descriptors based on the original set of clip descriptors and the attention vector are operable with the at least one processor to implement the neural network to: obtain a first set of clip descriptors by multiplying the original set of clip descriptors by the attention vector; obtain the enhanced set of clip descriptors by adding the first set of clip descriptors to the original set of clip descriptors.

As an implementation, the instructions being operable with the at least one processor 501 to implement the neural network 503 to input the enhanced set of clip descriptors into the at least one first fully connected layer and performing video recognition based on the output of the at least one first fully connected layer are operable with the at least one processor to implement the neural network to: determine a fifth vector based on the enhanced set of clip descriptors; obtain the output of the at least one first fully connected layer by multiplying the fifth vector by a weight of the at least one first fully connected layer; obtain an output of the neural network which is used for video recognition by processing the output of the at least one first fully connected layer based on a SoftMax function.

As an implementation, the memory 502 is further configured to store instructions which, when executed by the at least one processor 501, are operable with the at least one processor 501 to implement the neural network 503 to: obtain parameters of the neural network based on a loss, where parameters of the neural network include the weight of the at least one first fully connected layer and the weight of the at least one second fully connected layer and, the loss includes a classification loss corresponding to an output of the neural network and a sparsity loss corresponding to the attention vector.

As an implementation, the classification loss is based on a standard cross-entropy loss between a ground truth corresponding to the input and the output of the neural network corresponding to the input, and the sparsity loss is obtained by performing L1 norm on the attention vector.

Figure 6:
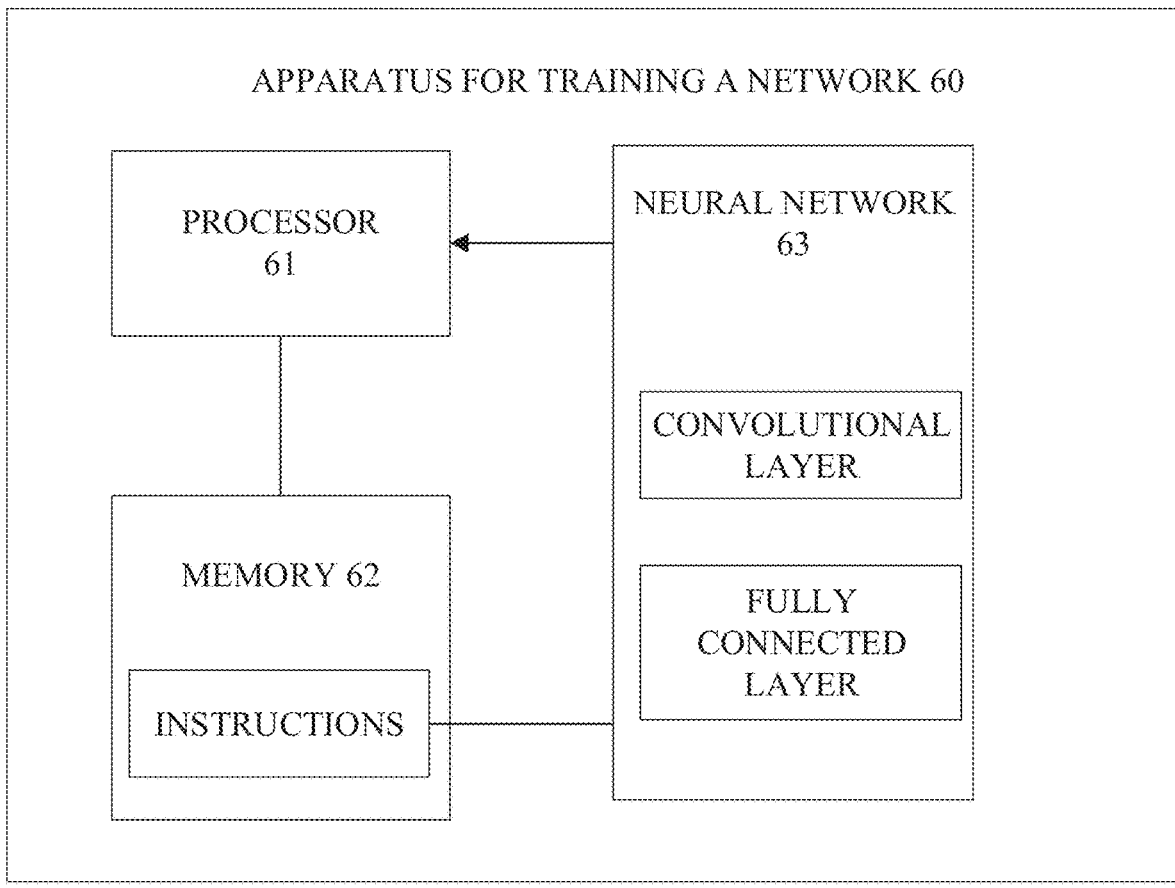
FIG. 6 is schematic structural diagram of an apparatus for training a neural network according to implementations.

FIG. 6 is a schematic structural diagram of an apparatus for training a neural network. As illustrated in FIG. 6, the apparatus includes at least one processor 601, a memory 602, and a neural network 603. The neural network 603 includes at least one convolutional layer and at least one fully connected layer. The at least one fully connected layer may further include at least one first fully connected layer and at least one second fully connected layer. The memory 602 is coupled with the at least one processor 601 and configured to store instructions which, when executed by the at least one processor, are operable with the processor to implement a neural network 603 to perform the following.

An original set of clip descriptors is obtained by providing multiple clips of a video as an input of a 3D CNN of a neural network, where the neural network includes the 3D CNN and at least one first fully connected layer, the 3D CNN includes at least one convolutional layer and at least one second fully connected layer, and each of the multiple clips includes at least one frame. An attention vector corresponding to the original set of clip descriptors is determined. An enhanced set of clip descriptors is obtained based on the original set of clip descriptors and the attention vector. The enhanced set of clip descriptors is input into the at least one first fully connected layer and an output of the neural network is obtained. The neural network is trained by updating parameters of the neural network based on a loss of the neural network, where the parameters of the network include a weight of the at least one first fully connected layer and a weight of the at least one second fully connected layer.

As an implementation, the instructions being operable with the at least one processor 601 to implement the neural network 603 to determine the attention vector corresponding to the original set of clip descriptors are operable with the at least one processor 601 to implement the neural network 603 to: obtain a first vector by performing a global average pooling on the original set of clip descriptors; obtain the attention vector by employing a gating mechanism on the first vector based on a weight of the at least one second fully connected layer, where the 3D CNN includes at least one convolutional layer and the at least one second fully connected layer.

As an implementation, the instructions being operable with the at least one processor 601 to implement the neural network 603 to obtain the attention vector by employing the gating mechanism on the first vector based on the weight of the at least one second fully connected layer are operable with the at least one processor 601 to implement the neural network 603 to: multiply the first vector by a first weight of the at least one second fully connected layer to obtain a second vector; process the second vector based on a rectified linear unit (ReLU) function to obtain a third vector; multiply the third vector by a second weight of the at least one second fully connected layer to obtain a fourth vector; process the fourth vector based on an activation function to obtain the attention vector.

As an implementation, the instructions being operable with the at least one processor 601 to implement the neural network 603 to obtain the enhanced set of clip descriptors based on the original set of clip descriptors and the attention vector are operable with the at least one processor 601 to implement the neural network 603 to: obtain the enhanced set of clip descriptors by multiplying the original set of clip descriptors by the attention vector.

As an implementation, the instructions being operable with the at least one processor 601 to implement the neural network 603 to obtain the enhanced set of clip descriptors based on the original set of clip descriptors and the attention vector are operable with the at least one processor 601 to implement the neural network 603 to: obtain a first set of clip descriptors by multiplying the original set of clip descriptors by the attention vector; obtain the enhanced set of clip descriptors by adding the first set of clip descriptors to the original set of clip descriptors.

As an implementation, the instructions being operable with the at least one processor 601 to implement the neural network 603 to input the enhanced set of clip descriptors into the at least one first fully connected layer and obtain an output of the neural network are operable with the at least one processor 601 to implement the neural network 603 to: determine a fifth vector based on the enhanced set of clip descriptors; obtain the output of the at least one first fully connected layer by multiplying the fifth vector by a weight of the at least one first fully connected layer; obtain an output of the neural network which is used for video recognition by processing the output of the at least one first fully connected layer based on a SoftMax function.

As an implementation, the loss includes a classification loss corresponding to the output of the neural network and a sparsity loss corresponding to the attention vector.

As an implementation, the classification loss is based on a standard cross-entropy loss between a ground truth corresponding to the input and the output of the neural network corresponding to the input, and the sparsity loss is obtained by performing L1 norm on the attention vector.

Implementations further provide a non-transitory computer storage medium. The computer storage medium is configured to store computer programs for electronic data interchange (EDI) which, when executed, are operable with a computer to perform some or all operations of any one of the foregoing method implementations. The computer includes a terminal.

Implementations further provide a computer program product. The computer program product includes a non-transitory computer-readable storage medium that stores computer programs. The computer programs are operable with a computer to execute some or all operations of any one of the foregoing method implementations. The computer program product may be a software installation package. The computer includes a terminal.

It is to be noted that, for the sake of simplicity, the foregoing method implementations are described as a series of action combinations, however, it will be appreciated by those skilled in the art that the present disclosure is not limited by the sequence of actions described. According to implementations, certain steps or operations may be performed in other order or simultaneously. Besides, it will be appreciated by those skilled in the art that the implementations described in the specification are exemplary implementations and the actions and modules involved are not necessarily essential to the present disclosure.

In the above implementations, description of each implementation has its own emphasis. For details not described in one implementation, reference can be made to related part in other implementations.

It will be appreciated that the apparatuses disclosed in implementations herein may also be implemented in various other manners. For example, the above apparatus implementations are merely illustrative, i.e., the division of units is only a division of logical functions, and there may exist other manners of division in practice, i.e., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or a software functional unit.

If the integrated units are implemented as software functional units and sold or used as standalone products, they may be stored in a computer readable storage medium. Based on such an understanding, the essential technical solution, or the portion that contributes to the prior art, or all or part of the technical solution of the disclosure may be embodied as software products. The computer software products can be stored in a storage medium and may include multiple instructions that, when executed, can cause a computing device, i.e., a personal computer, a server, a network device, etc, to execute some or all operations of the methods described in various implementations. The above storage medium may include various kinds of media that can store program codes, such as a universal serial bus (USB) flash disk, a read only memory (ROM), a random access memory (RAM), a mobile hard drive, a magnetic disk, or an optical disk.

It will be understood by those of ordinary skill in the art that all or part of the various methods of the implementations described above may be accomplished by means of a program to instruct associated hardware. The program may be stored in a computer-readable memory, which may include a flash memory, a ROM, a RAM, a magnetic disk, an optical disk, and so on.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. A method for video recognition, comprising:
obtaining an original set of clip descriptors by providing a plurality of clips of a video as an input of a three-dimensional (3D) convolutional neural network (CNN) of a neural network, wherein the neural network comprises the 3D CNN and at least one first fully connected layer, and each of the plurality of clips comprises at least one frame;
determining an attention vector corresponding to the original set of clip descriptors;
obtaining an enhanced set of clip descriptors based on the original set of clip descriptors and the attention vector; and
inputting the enhanced set of clip descriptors into the at least one first fully connected layer and performing video recognition based on an output of the at least one first fully connected layer.

2. The method of claim 1, wherein determining the attention vector corresponding to the original set of clip descriptors comprises:
obtaining a first vector by performing a global average pooling on the original set of clip descriptors; and
obtaining the attention vector by employing a gating mechanism on the first vector based on a weight of at least one second fully connected layer, wherein the 3D CNN comprises at least one convolutional layer and the at least one second fully connected layer.

3. The method of claim 2, wherein obtaining the attention vector by employing the gating mechanism on the first vector based on the weight of the at least one second fully connected layer comprises:
multiplying the first vector by a first weight of the at least one second fully connected layer to obtain a second vector;
processing the second vector based on a rectified linear unit (ReLU) function to obtain a third vector;
multiplying the third vector by a second weight of the at least one second fully connected layer to obtain a fourth vector; and
processing the fourth vector based on an activation function to obtain the attention vector.

4. The method of claim 1, wherein obtaining the enhanced set of clip descriptors based on the original set of clip descriptors and the attention vector comprises:
obtaining a first set of clip descriptors as the enhanced set of clip descriptors by multiplying the original set of clip descriptors by the attention vector.

5. The method of claim 1, wherein obtaining the enhanced set of clip descriptors based on the original set of clip descriptors and the attention vector comprises:
obtaining a first set of clip descriptors by multiplying the original set of clip descriptors by the attention vector; and
obtaining the enhanced set of clip descriptors by adding the first set of clip descriptors to the original set of clip descriptors.

6. The method of claim 1, wherein inputting the enhanced set of clip descriptors into the at least one first fully connected layer and performing video recognition based on the output of the at least one first fully connected layer comprises:
determining a fifth vector based on the enhanced set of clip descriptors;
obtaining the output of the at least one first fully connected layer by multiplying the fifth vector by a weight of the at least one first fully connected layer; and
obtaining an output of the neural network which is used for video recognition by processing the output of the at least one first fully connected layer based on a SoftMax function.

7. The method of claim 1, further comprising:
obtaining parameters of the neural network based on a loss, wherein parameters of the neural network comprise a weight of the at least one first fully connected layer and a weight of at least one second fully connected layer, the loss comprises a classification loss corresponding to an output of the neural network and a sparsity loss corresponding to the attention vector.

8. The method of claim 7, wherein the classification loss is based on a standard cross-entropy loss between a ground truth corresponding to the input and the output of the neural network corresponding to the input, and the sparsity loss is obtained by performing L1 norm on the attention vector.

9. A method for training a neural network, comprising,
obtaining an original set of clip descriptors by providing a plurality of clips of a video as an input of a three-dimensional (3D) convolutional neural network (CNN) of a neural network, wherein the neural network comprises the 3D CNN and at least one first fully connected layer, the 3D CNN comprises at least one convolutional layer and at least one second fully connected layer, and each of the plurality of clips comprises at least one frame;
determining an attention vector corresponding to the original set of clip descriptors;
obtaining an enhanced set of clip descriptors based on the original set of clip descriptors and the attention vector;
inputting the enhanced set of clip descriptors into the at least one first fully connected layer and obtaining an output of the neural network; and
training the neural network by updating parameters of the neural network based on a loss of the neural network, wherein the parameters of the neural network comprise a weight of the at least one first fully connected layer and a weight of the at least one second fully connected layer.

10. The method of claim 9, wherein the loss comprises a classification loss corresponding to the output of the neural network and a sparsity loss corresponding to the attention vector.

11. The method of claim 10, wherein the classification loss is based on a standard cross-entropy loss between a ground truth corresponding to the input and the output of the neural network corresponding to the input, and the sparsity loss is obtained by performing L1 norm on the attention vector.

12. A neural network based apparatus for video recognition, comprising:
at least one processor;
a memory coupled with the at least one processor and configured to store instructions which, when executed by the at least one processor, are operable with the processor to implement a neural network to:
obtain an original set of clip descriptors by providing a plurality of clips of a video as an input of a three-dimensional (3D) convolutional neural network (CNN) of a neural network, wherein the neural network comprises the 3D CNN and at least one first fully connected layer, and each of the plurality of clips comprises at least one frame;
determine an attention vector corresponding to the original set of clip descriptors;
obtain an enhanced set of clip descriptors based on the original set of clip descriptors and the attention vector; and
input the enhanced set of clip descriptors into the at least one first fully connected layer and perform video recognition based on an output of the at least one first fully connected layer.

13. The apparatus of claim 12, wherein the instructions being operable with the at least one processor to implement the neural network to determine the attention vector corresponding to the original set of clip descriptors are operable with the at least one processor to implement the neural network to:
obtain a first vector by performing a global average pooling on the original set of clip descriptors; and
obtain the attention vector by employing a gating mechanism on the first vector based on a weight of at least one second fully connected layer, wherein the 3D CNN comprises at least one convolutional layer and the at least one second fully connected layer.

14. The apparatus of claim 13, wherein the instructions being operable with the at least one processor to implement the neural network to obtain the attention vector by employing the gating mechanism on the first vector based on the weight of the at least one second fully connected layer are operable with the at least one processor to implement the neural network to:
multiply the first vector by a first weight of the at least one second fully connected layer to obtain a second vector;
process the second vector based on a rectified linear unit (ReLU) function to obtain a third vector;
multiply the third vector by a second weight of the at least one second fully connected layer to obtain a fourth vector; and
process the fourth vector based on an activation function to obtain the attention vector.

15. The apparatus of claim 13, wherein the instructions being operable with the at least one processor to implement the neural network to obtain the enhanced set of clip descriptors based on the original set of clip descriptors and the attention vector are operable with the at least one processor to implement the neural network to:
obtain a first set of clip descriptors as the enhanced set of clip descriptors by multiplying the original set of clip descriptors by the attention vector.

16. The apparatus of claim 12, wherein the instructions being operable with the at least one processor to implement the neural network to obtain the enhanced set of clip descriptors based on the original set of clip descriptors and the attention vector are operable with the at least one processor to implement the neural network to:
obtain a first set of clip descriptors as the enhanced set of clip descriptors by multiplying the original set of clip descriptors by the attention vector.

17. The apparatus of claim 12, wherein the instructions being operable with the at least one processor to implement the neural network to obtain the enhanced set of clip descriptors based on the original set of clip descriptors and the attention vector are operable with the at least one processor to implement the neural network to:

obtain a first set of clip descriptors by multiplying the original set of clip descriptors by the attention vector; and obtain the enhanced set of clip descriptors by adding the first set of clip descriptors to the original set of clip descriptors.

18. The apparatus of claim 12, wherein the instructions being operable with the at least one processor to implement the neural network to input the enhanced set of clip descriptors into the at least one first fully connected layer and performing video recognition based on the output of the at least one first fully connected layer are operable with the at least one processor to implement the neural network to:

determine a fifth vector based on the enhanced set of clip descriptors;

obtain the output of the at least one first fully connected layer by multiplying the fifth vector by a weight of the at least one first fully connected layer; and obtain an output of the neural network which is used for video recognition by processing the output of the at least one first fully connected layer based on a SoftMax function.

19. The apparatus of claim 12, wherein the memory is further configured to store instructions which, when executed by the at least one processor, are operable with the at least one processor to implement the neural network to:

obtain parameters of the neural network based on a loss, wherein parameters of the neural network comprise a weight of the at least one first fully connected layer and a weight of at least one second fully connected layer, the loss comprises a classification loss corresponding to an output of the neural network and a sparsity loss corresponding to the attention vector.

20. The apparatus of claim 19, wherein the classification loss is based on a standard cross-entropy loss between a ground truth corresponding to the input and the output of the neural network corresponding to the input, and the sparsity loss is obtained by performing L1 norm on the attention vector.

* * * * *